United States Patent [19]

Kawamata et al.

[11] Patent Number: 5,455,093
[45] Date of Patent: Oct. 3, 1995

[54] FLEXIBLE MAGNETIC DISK AND PROCESS FOR PREPARING THE SAME

[75] Inventors: Toshio Kawamata; Masaya Kojima; Kazuhiro Niitsuma, all of Kanagawa, Japan

[73] Assignee: Fuji Photo Film Co., Ltd., Kanagawa, Japan

[21] Appl. No.: 45,252

[22] Filed: Apr. 13, 1993

[30] Foreign Application Priority Data

Apr. 13, 1992 [JP] Japan ................................. 4-118518

[51] Int. Cl.⁶ .............................. B32B 3/02; B32B 5/16; G11B 5/66
[52] U.S. Cl. .................. 428/65.3; 428/323; 428/328; 428/332; 428/336; 428/694 B; 428/694 BS; 428/694 BN; 428/694 BM; 428/694 BA; 428/694 BR; 360/99.01; 360/135
[58] Field of Search ................... 428/64, 694 B, 428/694 BS, 694 BN, 694 BM, 694 BR, 65, 323, 329, 332, 336, 694 BA, 900; 360/99.01, 135

[56] References Cited

U.S. PATENT DOCUMENTS 4,646,179  2/1987  Nagashima et al. ...................... 360/99
4,693,934  9/1987  Nishimatsu et al. ..................... 428/336
4,780,366  10/1988  Nishimatsu et al. .................... 428/323

FOREIGN PATENT DOCUMENTS 3419285  10/1989  Germany ........................... G11B 5/82
53-66203  6/1978  Japan ................................ G11B 5/62

*Primary Examiner*—L. Kiliman
*Attorney, Agent, or Firm*—Sughrue, Mion, Zinn, Macpeak & Seas

[57] ABSTRACT

A flexible magnetic disk is disclosed, which comprises a non-magnetic support having thereon a non-magnetic layer comprising mainly a non-magnetic powder and a binder resin, and a magnetic layer comprising mainly a ferromagnetic layer and a binder resin, in this order, wherein at least a part of the non-magnetic powder in the non-magnetic layer is an electrically conductive powder, and therein the product $Et^3$ of Young's modulus (E) of the flexible magnetic disk and the cube of the thickness (t) thereof is 50 to 210 g·mm. The magnetic layer preferably has a thickness of not more than 0.5 μm and the ferromagnetic powder preferably is ferromagnetic metallic powder or ferromagnetic hexagonal ferrite powder.

7 Claims, No Drawings

FLEXIBLE MAGNETIC DISK AND PROCESS FOR PREPARING THE SAME

FIELD OF THE INVENTION

This invention relates to a flexible magnetic disk for high-density recording, and more particularly to a flexible magnetic disk for data recording. It also relates to a process for preparing the same.

BACKGROUND OF THE INVENTION

Magnetic recording systems have several excellent advantages such as allowing for repeated use of magnetic recording mediums easy conversion of recorded information into electric signals, allowing for the magnetic recording system to be combined with peripheral electronic equipment to form a composite system and easy correction of electric signals as compared to other recording systems. Accordingly, the magnetic recording system has been widely used in the fields of video, audio, computer, etc. It has been demanded that the recording density of the recording mediums be further improved to meet the requirements of miniaturization of equipment, improvement in the quality of reproducing signals, prolonging the recording and increasing the recording capacity.

In coated magnetic recording disks, various methods have been proposed such as a method wherein ferromagnetic powder having a finer particle size is used, a method wherein dispersibility is improved, and a method wherein the packing degree of ferromagnetic powder in a magnetic layer is increased. As a further effective means, there is a method using ferromagnetic metallic powder having excellent magnetic characteristics or hexagonal ferrite.

With the popularization of miniature computers and personal computers as OA (Office Automation) equipment, magnetic recording disks for external memory have come into wide use causing the use of magnetic recording disks to increase.

The magnetic recording disks are stored and used under wide environmental conditions, that is, under wide temperature and humidity conditions, and are further used in places where working conditions are dusty.

It is highly demanded that recording density be improved to achieve large-capacity recording. In particular, it is demanded that the disks be miniaturized. The maximum size of conventional acicular ferromagnetic powders must be much smaller than the recording wavelength or recording bit length in order to obtain a magnetic recording disk suitable for high-density recording. At present, acicular ferromagnetic powders having the size of about 0.3 µm are being used allowing for the possibility of a recording wavelength as short as about 1 µm or less.

The size of the acicular ferromagnetic powder must be decreased to obtain a recording medium capable of conducting higher-density recoding. In such acicular ferromagnetic powder, however, the particle has a size as small as 100 Å or less and a volume as small as $1 \times 10^{-17}$ cm$^3$ or less. As a result, problems occur such as a lowering of the magnetic characteristics by thermal agitation and surface effect, and sufficient orientation can not be obtained even when a magnetic field is applied to the magnetic coating.

Ferromagnetic metallic powder has been examined as a possible ferromagnetic powder to be used to obtain a high-density recording. Further, magnetic recording mediums using, as the ferromagnetic powder, hexagonal ferrite particles having a tabular form and an axis of easy magnetization in the direction perpendicular to the crystal face [e.g., those described in JP-A-58-6525 (the term "JP-A" as used herein means an "unexamined published Japanese patent application") and JP-A-58-6526] have been developed in recent years. By providing the particles, the average particle size of the ferromagnetic powder could be decreased to 0.05 µm or smaller and a high-density recording could be possible.

It has been demanded that narrower track width used to make further higher-density recording. The use of ferromagnetic metallic powder or ferromagnetic hexagonal ferrite powder capable of achieving high output and high-density recording has been examined in the field of the magnetic disk to meet these demands. Studies have been made to meet the demands of the miniaturization of the magnetic disk and the improvement of recording density. A thinner magnetic layer and a higher output are demanded to improve high-density recording and overwrite electromagnetic characteristics in particular. With a reduction in the thickness of the magnetic layer, there is a fear that running durability would greatly deteriorate. Further, failure in head touch is caused by high-speed revolution with high-density recording.

The overwriting of recording signals having different magnetic wavelengths is usually necessary in magnetic recording disks, such as floppy disks, for use in computers. Heretofore, only the overwriting of two types of signals having different frequencies wherein one is twice as long as the other, that is, the overwriting of 1f and 2f signals is requested. However, for the popular high-capacity magnetic recording disks of 10M byte, not only is the recording wavelength shortened, but also it is demanded that the overwriting of a plurality of signals in a wider frequency ratio of 3:8, such as a RLL signals, can be made. When signals are used wherein the recording wavelengths are short and the difference in recording frequency is large, the overwriting of a signal having a short recording wavelength on a signal having a long recording wavelength as disclosed in JP-A-58-122623 and JP-A-61-74137 can be suitably achieved only by improving the magnetic characteristics of the magnetic layer.

Namely, in the case of conventional magnetic layers having a thickness of 1.0 µm or more, the line of magnetic force does not reach the depth of the magnetic layer when a signal having a shorter recording wavelength is overwritten onto a previously recorded signal having a longer recording wavelength. Accordingly, the previously recorded signal having a longer wavelength can not be erased.

Further, the gap of recording head is narrowed with the improvement of recording density. Accordingly, sufficient recording in the direction of the depth of the recording medium becomes difficult.

Hence, when the thickness of the magnetic layer is reduced to 1 µm or less to solve the above problems, the magnetic layer is liable to be peeled off, drop-out is caused, running durability cannot be ensured, and reliability is reduced.

Accordingly, the improvement of reproducing output, the ensuring of overwrite characteristics and running durability are important factors to provide a magnetic recording disk capable of coping with the above-described high-density recording.

The charging of the magnetic recording disk during running causes an increase in the number of drop-outs due to the deposition of dust. The error rate caused thereby is a serious problem. To improve the -problem with regard to charging, an additive is usually added to prevent the charging of the magnetic layer. Particularly, the addition of carbon black is most effective and widely used. However, the addition of carbon black in the magnetic recording disks for high-density recording reduces the packing density of the magnetic substance and causes a lowering in output. Hence there is a limit to the amount of carbon black to be added, and it is difficult to prevent charging of the disks.

The aforesaid ferromagnetic hexagonal ferrite powder is low in saturation magnetization amount, and when used, it is difficult to obtain a high output as compared to the use of ferromagnetic Co—$Fe_2O_3$ powder and ferromagnetic metallic powder. Accordingly, the packing density of the ferromagnetic hexagonal ferrite powder must be increased to provide a magnetic recording disk having a high output. However, since the ferrite powder is composed of fine particles and has a hexagonal form, dispersibility is poor in comparison with conventional ferromagnetic powders. Accordingly, it is difficult to prevent charging of the disks and a high reproducing output.

Various proposals have been made to meet the requirement for the prevention of charging of the disks, high output and the improvement of durability (see, JP-A-55-55431, JP-A-55-55432, JP-A-55-55433, JP-A-55-55434, JP-A-60-164926, JP-A-55-55436, JP-A-62-38523 and JP-A-62-159337).

Specifically, an interlayer is provided between the magnetic layer and the support. Carbon black and a binder resin are coated as the interlayer, and the magnetic layer is then formed on the interlayer.

This method is effective in improving running durability. In the magnetic recording disks for high-density recording, however, it is impossible to obtain excellent electromagnetic characteristics, that is, high reproducing output and satisfactory overwrite characteristics, while keeping sufficient running durability.

When the magnetic layer is extremely thinned, the thickness of the magnetic layer is reduced to 0.5 μm or less to improve overwrite characteristics, and the following problems result by the use of conventional coating techniques.

(1) It is difficult to coat the magnetic layer having a uniform thickness directly on a non-magnetic support. Further, the magnetic layer is liable to be peeled off.

(2) The interlayer (a non-magnetic layer) is used as a lower layer, and the magnetic layer can be coated on the interlayer. However, when coating is conducted layer at a time, an adhesion problem is caused and there is a possibility that the magnetic layer is peeled off and dropout may result.

Studies have shown that multi-layer coating while the non-magnetic layer and the magnetic layer are still in a wetted state, i.e., a wet-on-wet coating system (described in U.S. Pat. No. 4,844,946) is effective in solving the above-described problems.

However, the above-described problems can not be fully solved merely by using the wet-on-wet coating system. The magnetic disk must also be rotated at a high speed with a reduction in track width and an increase in the recording density as mentioned above. In this case, it is difficult to keep the touch of the magnetic head on the surface of the magnetic disk stably. Namely, it is difficult to maintain the accuracy of the magnetic head on the recording track in order to achieve high-density recording.

It is considered that the touch of the magnetic head can be improved by improving the mechanical characteristics of the magnetic disk. Heretofore, inventions for controlling the stiffness of magnetic tapes have been disclosed in the magnetic tape field. For example, JP-A-58-9214 discloses an embodiment wherein the stiffness of thin metal film type magnetic tapes is controlled to from 0.1 to 10 g·mm. JP-A-60-261020 and JP-A-61-29417 disclose an embodiment wherein the stiffness of the thin metal film type magnetic tapes and ferromagnetic alloy metal powder-coated tapes is controlled by a loop system measuring method. JP-A-53-66203 discloses an embodiment wherein the stiffness in the crosswise direction (i.e., width detection) of thin metal film type magnetic tapes is kept at a value which is larger than that in the lengthwise direction (i.e., machine direction) thereof.

However, the control of the stiffness of the flexible magnetic disk is not disclosed or suggested in any patent specifications. Accordingly, conditions described in the above-described patent specifications could not be applied to the flexible magnetic disk.

Improvements in devices have been proposed as other means for improving head touch. For example, attempts to improve head mechanisms, such as to raise head pressure, have been made. However, the durability of the magnetic disk is deteriorated, and other problems occur.

An effective method which overcomes these problems has not yet been proposed.

The present invention has been accomplished with the view of solving the problems associated with the prior art.

SUMMARY OF THE INVENTION

An object of the present invention is to provide a flexible magnetic disk for high-density recording, which allows for good head touch, that is, a magnetic disk that has good electromagnetic characteristics and which is excellent in running durability.

Another object of the present invention is to provide a process for preparing a flexible magnetic disk for high-density recording, which has good electromagnetic characteristics and is excellent in running durability.

Accordingly, the present invention provides a flexible magnetic disk comprising a non-magnetic support having thereon a non-magnetic layer comprising mainly a non-magnetic powder and a binder resin, and a magnetic layer comprising mainly a ferromagnetic powder and a binder resin, in this order, wherein at least a part of the non-magnetic powder contained in the non-magnetic layer is an electrically conductive powder, and the product $Et^3$ of Young's modulus (E) of the flexible magnetic disk and the cube of the thickness (t) thereof, is 50 to 210 g·mm.

Further, the present invention provides a process for preparing a flexible magnetic disk comprising a non-magnetic support having thereon a non-magnetic layer and a magnetic layer, in this order comprising the step of:

a) coating a coating solution comprising mainly a non-magnetic powder and a binder resin for forming a non-magnetic layer on the non-magnetic support, wherein at least a part of the non-magnetic powder is an electrically conductive powder;

b) coating a coating solution comprising mainly a ferromagnetic powder dispersed in a binder resin solution on the non-magnetic layer while the non-magnetic layer is still in a wet state for forming the magnetic layer on the non-magnetic layer; and c) drying the resulting layers to form the flexible magnetic disk, wherein the product $Et^3$ of Young's modulus (E) of the flexible magnetic disk and the cube of the thickness (t) thereof is 50 to 210 g·mm.

DETAILED DESCRIPTION OF THE INVENTION

The present invention will be illustrated in more detail below.

The feature of the present invention resides in the fact that the product of Young's modulus (E) of the flexible magnetic film and the cube of the thickness (t) thereof, that is, $Et^3$ is controlled to from 50 to 210 g·mm, whereby head touch in the high-speed revolution of the flexible magnetic disk for high-density recording can be improved.

When a magnetic disk is set to a device, commonly called FDD (i.e., Floppy Disk Drive), for conducting recording/reproduction by operating the magnetic disk, a pair of lower and upper head positions are designed so that they are uniformly set to both sides of the magnetic disk. However, since the magnetic disk is mass-produced, there is often a possibility that the magnetic disk is set toward the lower-side head or the upper-side head. In this case, the flexible magnetic disk is not as flat toward the inner periphery of the magnetic disk, and is revolved in a deformed state. In this case, head touch becomes extremely poor, recording/reproduction is insufficiently made and errors are caused.

In the case of high-density recording and high-speed revolution, in particular, the possibility exists for a serious failure in head touch and for no generation of output at all.

The present invention provides a flexible magnetic disk which does not cause any error even when the FDD is set under these particular conditions. Namely, the present inventors have studied the range mechanical characteristics of the magnetic disk, within which contact of the magnetic disk with the magnetic head can be satisfactorily ensured without causing damage to the magnetic disk. This solves the problem of failure in head touch caused by high-speed revolution during high-density recording. As a result, it has been found that the problem can be solved by controlling $Et^3$ to from 50 to 210 g·mm.

It has also been found that when $Et^3$ is controlled to within the range defined above, overwrite characteristics can be improved by reducing the thickness of the magnetic layer, and excellent running durability can be ensured.

On the other hand, when the thickness of the magnetic layer is reduced in conventional magnetic disks used in high-density recording in order to improve overwrite characteristics, the durability of the magnetic layer is greatly deteriorated by reducing the thickness of the magnetic layer, which results in peeling-off of the magnetic layer and stopping of its function.

In the present invention, at least a part of the non-magnetic powder which is contained in the non-magnetic layer is electrically conductive powder, whereby the surface of the magnetic disk is prevented from being charged and drop-out is prevented from being caused by the adhesion of dust. Preferably, a lubricant is also added to the non-magnetic layer during manufacture in a range satisfying the scope of the above $Et^3$ of the present invention, to thereby add the lubricant to the non-magnetic layer. This lubricant is not present in the magnetic layer, and as a result an amount of the lubricant can be constantly fed to the magnetic layer during use and running durability can be ensured.

In the present invention, $Et^3$ is preferably 50 to 210 g·mm, more preferably 70 to 200 g·mm, particularly preferably 80 to 180 g·mm.

When $Et^3$ is less than 50 g·mm, the flexible magnetic disk does not slide flatly and is deformed in the sliding of the head on the disk. When $Et^3$ is larger than 210 g·mm, the rigidity of the disk is too large, the fluctuation of output is too large, and hence when the head is deviates from the disk, the fluctuation of output is too large and the disk cannot be put to practical use.

Young's modulus E is a value obtained by making measurement at a stress rate of 10%/min in an atmosphere of 23° C. and 70% RH with a tensile testing machine (universal tensile testing machine STM-T-50BP manufactured by Toyo Baldwin Co., Ltd.). The Young's modulus value E employed in the present invention is the larger one of that in the lengthwise direction (coated direction) of the disk and that in the crosswise direction (in the direction perpendicular to the coated direction) thereof. The ratio of a difference $\Delta E$ between Young's modulus in the lengthwise direction and that in the crosswise direction to E is within the range of generally from −20% to +20%, preferably from −12% to +12%. The thickness t is a value obtained by placing 10 sheets of the disks in layers, measuring the thickness of the laminate with a micrometer and dividing the value by 10 to determine the thickness of one sheet.

In the present invention, Young's modulus of the non-magnetic support, the non-magnetic layer, and the magnetic layer, participates in controlling $Et^3$ to the above-described range.

Examples of balance type supports which can be used for the flexible magnetic disks include polyesters, polyimides, polyaramid and syndiotactic polystyrene. Polyethylene terephthalate, which is a typical example of the polyesters, has a Young's modulus of 400 to 700 kg/mm². Polyethylene naphthalate, which is also an example of a polyester, has a Young's modulus of 550 to 700 kg/mm². Polyimides have a Young's modulus of 350 to 400 kg/mm². Polyaramid has a Young's modulus of 1300 to 1500 kg/mm². Syndiotactic polystyrene has Young's modulus of 350 to 450 kg/mm². These Young's moduli each is a Young's modulus in both the lengthwise and crosswise directions.

The Young's modulus of the non-magnetic layer and the magnetic layer in both the lengthwise and crosswise (i.e., width) directions is controlled to generally 100 to 1,000 kg/mm², preferably 300 to 900 kg/mm², more preferably 400 to 800 kg/mm². It is preferred that the Young's modulus of the non-magnetic layer be slightly larger than that of the magnetic layer.

The Young's modulus of the non-magnetic support, Young's modulus of the non-magnetic layer and the Young's modulus of the magnetic layer are controlled, and further, the overall thickness (including the thickness of the support) of the disk of the present invention must be controlled to set $Et^3$ to a predetermined value.

The thickness of the flexible magnetic disk of the present invention can be arbitrarily set so as to give $Et^3$ in a predetermined range. Accordingly, when the value of E is small, the value of t is large, and when the value of E is large, the value of t is small, so that $Et^3$ may be maintained within the range defined above. Generally, the value of t is in the range of generally 10 to 80 μm, preferably 20 to 70 μm, and the value of E is in the range of generally 300 to 2,000 kg/mm², preferably 380 to 1500 kg/mm².

The thickness of the flexible magnetic disk of the present invention is such that the non-magnetic support has a thickness of preferably 20 to 70 μm, the non-magnetic layer has a thickness of 0.5 to 10 μm, preferably 0.5 to 3 μm, and the magnetic layer has a thickness of preferably not more than 0.5 μm, more preferably not more than 0.4 μm. An undercoating layer may be provided to improve adhesion between the non-magnetic support and the non-magnetic layer. The thickness of the undercoating layer is generally 0.01 to 2 μm, preferably 0.05 to 0.5 μm. A back coating layer may be provided on the side of the non-magnetic support opposite of the magnetic layer. The thickness of the back coating layer is generally 0.1 to 2 μm, preferably 0.3 to 1.0 μm. The undercoating layer and the back coating layer may be those conventionally used. The magnetic layer may be provided on one side or both sides of the flexible magnetic disk of the present invention. A layer containing a resin and/or a lubricant may be provided as a protective layer on the surface of the magnetic layer.

The flexible magnetic disk of the present invention has a stiffness of preferably 4.5 to 8.4 g, more preferably 5.0 to 8.0 g, particularly preferably 6 to 7.8 g in terms of loop system flexural rigidity. The loop system flexural rigidity can be measured by making a loop from a sample of 50 mm long by 8 mm wide, and measuring the force required for giving a displacement of 5 mm at a displacement rate of 3.5 mm/sec with a loop stiffness tester and representing the force by a number in grams.

In the recording system using the flexible magnetic disk of the present invention, it is preferred that the innermost periphery of the recording track has a diameter of preferably not smaller than 20 mm, more preferably not smaller than 23 mm, whereby there can be obtained an advantage that head touch can be made better.

The flexible magnetic disk having an $Et^3$ in the range described above according to the present invention can be prepared by any process without particular limitation, so long as the non-magnetic layer is formed on the non-magnetic support, and the magnetic layer is formed on the non-magnetic layer. However, it is preferred that the flexible magnetic disk of the present invention is prepared by a wet-on-wet coating system (described in U.S. Pat. No. 4,844,946) wherein a coating solution comprising mainly a non-magnetic powder and a binder resin is coated on the non-magnetic support to form the non-magnetic layer; a coating solution comprising mainly a ferromagnetic powder dispersed in a binder resin solution is coated on the non-magnetic layer while the non-magnetic layer is still in the wet state to form the magnetic layer; and drying is then conducted to form the flexible magnetic disk comprising the non-magnetic support having thereon the non-magnetic layer and the magnetic layer in this order.

The wet-on-wet coating system has advantages in that the adhesion of the interface between the magnetic layer and the non-magnetic layer can be improved, the magnetic layer is prevented from being peeled off, and excellent running durability can be obtained. Further, according to the wet-on-wet coating system, the surface of the non-magnetic layer solidified by drying is not dissolved by a solvent contained in the magnetic layer, the solvent being dissolved out when the successive coating is conducted. Accordingly, the surface properties of a smooth magnetic layer can be obtained and a high reproducing output can be attained.

When the non-magnetic layer is provided on the support and the magnetic layer is then provided on the dried non-magnetic layer by the conventional blade coating method or gravure coating method, adhesion between the non-magnetic layer and the magnetic layer is poor, and when the magnetic layer is an ultra-thin magnetic layer as in the present invention, durability is poor and it is a difficulty to put the resulting magnetic disk for practical use.

Examples of the wet-on-wet coating system include the following methods.

1. A method wherein the non-magnetic layer is first coated by a gravure coating, roll coating, blade coating or an extrusion coating device conventionally used for the coating of magnetic coating compositions, and the magnetic layer is then coated by means of a non-magnetic support pressing type extrusion coating device as described in JP-B-1-46186 (the term "JP-B" as used herein means an "examined Japanese patent publication"), JP-A-60-238179 and JP-A-2-265672, while the non-magnetic layer is still in a wet state.

2. A method wherein a coating solution for the non-magnetic layer and a coating solution for the magnetic layer are coated nearly simultaneously through a head having two slits through which the coating solutions are passed as described in JP-A-63-88080, JP-A-2-17971 and JP-A-2-265672.

3. A method wherein a coating solution for the non-magnetic layer and a coating solution for the magnetic layer are coated nearly simultaneously by using an extrusion coating device provided with a back-up roll as described in JP-A-2-174965.

The present invention also provides a process for preparing the flexible magnetic disk wherein the non-magnetic layer and the magnetic layer are formed preferably by the wet-on-wet coating system while controlling the $Et^3$ in a predetermined range. The process of the present invention will be illustrated below.

First, the type and amount of the lubricant to be used in the coating solution for the non-magnetic layer and in the coating solution for the magnetic layer should be carefully chosen. This is because the lubricant has a function capable of plasticizing the binder resin and is also a factor for controlling the Young's modulus of the non-magnetic layer and the magnetic layer.

Secondly, in the wet-on-wet coating system, it is preferred that the viscoelastic characteristics of the coating solution for the non-magnetic layer and those of the coating solution for the magnetic layer are adjusted so as to allow them to be approximated to each other as close as possible. When the viscoelastic characteristics of the coating solutions are greatly different from each other, the solutions are disordered at the interface therebetween and the thickness of the magnetic layer is greatly fluctuated, since the magnetic layer is provided while the non-magnetic layer is still in a wet state.

Specific factors important in adjusting the viscoelastic characteristics include the following factors.

Examples of the factors with regard to non-magnetic powder or ferromagnetic powder to be dispersed include (1) particle size (specific surface area, average primary particle size, etc.), (2) structure (oil absorption, particle shape, etc.), (3) surface properties of powder (pH, weight loss on heating, etc.), (4) cohesive force of particle ($\sigma_s$, etc.), etc. Examples of the factors with regard to the binder include (1) molecular weight, (2) the types of functional groups, etc. Examples of the factors with regard to solvents include (1) types (polarity, etc.), (2) solubility of the binder therein, (3) the amount of the solvent to be formulated, water content, etc.

Thirdly, it is desirable that the size of raw particles to be contained in the coating solution for each of the non-magnetic layer and the magnetic layer be smaller than the thickness of each of the non-magnetic layer and the magnetic layer, respectively after drying.

Fourthly, the size and shape of powders to be contained in the coating solution for the magnetic layer and/or in the coating solution for the non-magnetic layer, are controlled so as not to allow a mixed zone to form at the interface between the magnetic layer and the non-magnetic layer. Further, the amounts of powders to be added are properly chosen, so that the physical characteristics of each layer can be controlled.

Since the magnetic layer of the present invention is a thin layer having an average thickness of as thin as preferably 0.5 µm or less, overwrite characteristics specific to digital recording can be greatly improved. The higher the line recording density, that is, the shorter the recording wavelength, the more exhibited will be the effect of the thickness of the magnetic layer. Particularly, when the recording wavelength is 1.4 µm or shorter, the thickness of the magnetic layer must be 0.5 µm or less so that the above-described controlling factors improve head touch. These factors, in turn, are important in ensuring the stability of overwrite characteristics and in keeping a stable high reproducing output.

Since the flexible magnetic disk of the present invention can generate high output and high reproducing output which is stable and uniform over the whole periphery by using ferromagnetic powder or ferromagnetic hexagonal ferrite powder, the ratio of orientation degree can be set to a value of at least 0.85. A ratio of orientation degree of at least 0.85 can be obtained by using a random orientation method using permanent magnets as described in JP-B-3-41895 or a method wherein an AC magnetic filed is applied as described in JP-A-63-148417, JP-A-1-300427 and JP-A-1-300428 while the magnetic layer is still in an undried state.

A orientation degree of as high as at least 0.9 can be obtained in the present invention when ferromagnetic metallic powder or hexagonal ferrite powder is used.

The term "ratio of orientation degree" as used herein refers to a value obtained by dividing the minimum squareness ratio by the maximum squareness ratio in the peripheral direction.

In the present invention, not only can electromagnetic characteristics be improved as mentioned above, but also the adhesion between the non-magnetic layer and the magnetic layer can be ensured by using the wet-on-wet coating system as well as excellent running durability.

The non-magnetic layer of the magnetic recording disk of the present invention mainly comprises non-magnetic powder and a binder resin. The non-magnetic powder includes inorganic powder and organic powder. At least a part of the non-magnetic powder comprises electrically conductive powder. The electrically conductive powder is effective in adjusting the Young's modulus of the non-magnetic layer, controlling the viscoelastic characteristics of the coating solution, and in controlling the surface electric resistance of the magnetic layer. A particularly preferred electrically conductive powder is carbon black.

The amount of carbon black contained in the non-magnetic layer is preferably 3 to 20% by weight, particularly preferably 5 to 15% by weight based on the total amount of the non-magnetic powder contained in the non-magnetic layer. When the amount of carbon black is less than 3% by weight, surface inherent resistivity can not be sufficiently reduced, while when the amount is more than 20% by weight, the smooth surface properties of the magnetic layer can not be sufficiently obtained, though surface inherent resistivity can be reduced. The specific surface area of the carbon black is preferably 5 to 1200 m$^2$/g, more preferably 50 to 1000 m$^2$/g. The DBP (dibutyl phthalate) oil absorption of the carbon black is generally 10 to 1500 mL (milliliter)/100 g, preferably 20 to 600 mL/100 g. The average particle size of the carbon black is generally 5 to 500 µm, preferably 10 to 300 µm, the pH thereof is 2 to 10, the water content thereof is 0.1 to 10%, and the tap density (measured under the condition of member of tapping: 150 and head: 30 mm using Tap density measuring instrument manufactured by Seishin Enterprise Inc.) thereof is preferably 0.1 to 1 g/ml.

The amount of carbon black to be added to the magnetic layer can be reduced by using carbon black in the non-magnetic layer. Further, the packing density of the ferromagnetic powder can be ensured.

Since carbon black can form a structure, a low surface electric resistance can be obtained. Hence, the surface inherent electric resistivity of the magnetic layer can be depressed to a low value, and the occurrence of drop-out in running (durability) can be reduced.

In the present invention, it is preferred that the surface electric inherent resistivity (resistance) of the magnetic layer is controlled to preferably $5 \times 10^9$ Ω/sq or less, more preferably $5 \times 10^8$ Ω/sq or less. In the present invention, the smooth surface properties of both the non-magnetic layer and the magnetic layer can be obtained, the spacing loss between the recording track and the reproducing head can be reduced, and a high reproducing output can be obtained. Further, carbon black having DBP oil absorption of not less than 200 mL/100 g can easily form a structure and as a result, a low surface (inherent) electric resistivity can be obtained, and the occurrence of drop-out in running (durability) can be reduced.

The DBP oil absorption of carbon black is measured in the following manner. Dibutyl phthalate is added portionwise to carbon black powder. While kneading the mixture, the state of carbon black is observed, and there is found the point at which carbon black powder in a loosely dispersed state forms a lump. The amount (mL) of dibutyl phthalate added up to the formation of the lump is referred to as the DBP oil absorption.

Carbon black is effective in imparting electrical conductivity to the magnetic recording disk to thereby prevent the magnetic recording disk from being charged, and can be used as one of the materials for controlling the physical strength of both the magnetic layer and the non-magnetic layer. Therefore, carbon black is effective in controlling $Et^3$ in the present invention. Further, carbon black is capable of controlling the viscoelastic characteristics of the coating solution for the non-magnetic layer. Furthermore, carbon black is very useful in adjusting the coefficient of friction and in imparting light screening properties. Accordingly, carbon black is contained in the magnetic layer for the above-described purpose. Carbon black used in the magnetic layer is present in an amount of preferably 0.1 to 30% by weight (more preferably 0.3 to 5% by weight) based on the amount of ferromagnetic powder. The carbon black used in the magnetic layer has various average particle size according to the purpose for using the carbon black. For example, the carbon black having preferably 10 to 100 mµ (more preferably 70 to 500 mµ) is used for imparting the electrical conductivity, and the carbon black having preferably 70 to 500 mµ (more preferably 80 to 300 mµ) is used for decreasing the coefficient of friction.

Carbon black prepared by any of conventional methods can be used in either or both the non-magnetic layer or the magnetic layer of the present invention. Examples of carbon black which can be used in the present invention include furnace black, thermal black, acetylene black, channel black and lamp black. Specific examples of carbon black include BLACK PEARLS 2000, 1300, 1000, 900, 800 and 700, VULCAN XC-72 (manufactured by Cabot Co., Ltd.); #80, #60, #55, #50 and #35 (manufactured by Asahi Carbon Co., Ltd.); #3950B, #2400, #2300, #900, #1000, #30, #40, and #10B (manufactured by Mitsubishi Chemical Corporation). Other examples include CONDUCTEX SC, RAVEN 150, 50, 40 and 15 (manufactured by Columbia Carbon Co., Ltd.); and Ketjen Black EC, Ketjen Black ECDJ-500 and Ketjen Black ECDJ-600 (manufacture by Lion Akzo Co., Ltd.).

The surface of carbon black may be treated. Carbon black may be grafted with a resin. A part of the surface of carbon black may be graphitized. Carbon black may be dispersed in the binder before the carbon black is added to the coating solution for the non-magnetic layer or to the coating solution for the magnetic layer. Carbon black may be used either alone or a combination of two or more kinds of carbon black may be used.

Carbon black has effects of imparting antistatic properties to the magnetic layer, reducing the coefficient of friction thereof, imparting light-screening properties thereto and improving the strength of the magnetic layer. These effects vary depending on the types of carbon black used. Accordingly, the types, amounts and combinations of carbon black contained in the non-magnetic layer and the magnetic layer in the present invention are chosen according to the characteristics such as particles size, oil absorption, electrical conductivity, pH, etc, depending on the specific effect desired. Carbon black which can be used in the present invention can be chosen by referring to *Carbon Black Handbook* (published by Carbon Black Society of Japan).

Examples of ferromagnetic powder which can be contained in the magnetic layer of the magnetic recording disk of the present invention, include iron oxide-based ferromagnetic powder, ferromagnetic metallic powder and ferromagnetic hexagonal ferrite powder. Among them, ferromagnetic metallic powder and ferromagnetic hexagonal ferrite powder are preferred.

When the ferromagnetic powder to be used is ferromagnetic metallic powder, the specific surface area thereof is 30 to 60 m$^2$/g, the crystallite size thereof determined from X-ray diffractometry is 10 to 300 Å, and the axis ratio (length in the long axis/length in the short axis) is at least 5.

When the specific surface area is too small, the magnetic disk can not sufficiently cope with high-density recording. When the specific surface area is too large, metallic powder can not be sufficiently dispersed, a magnetic layer having a smooth surface can not be formed, and the magnetic disk can not cope with high-density recording.

The crystallite size of the ferromagnetic powder can be determined from the spread of the half width of diffraction patterns of the (1,1,0) face and the (2,2,0) face.

When the ferromagnetic powder to be used is ferromagnetic hexagonal ferrite powder, the specific surface area thereof is 25 to 50 m$^2$/g the tabular ratio (tabular diameter/tabular thickness) is 2 to 6, and the tabular diameter is 0.02 to 1.0 μm.

Too large a particle size or too small a particle size causes difficulty in conducting high-density recording as in the case of the ferromagnetic metallic powder described above.

The above-described ferromagnetic metallic powder is preferably a powder containing at least Fe. Specific examples of the ferromagnetic metallic powder used in the present invention include a metal and alloy such as and Fe, and Fe—Co, Fe—Ni, and Fe—Ni—Co alloys. In order to enable the magnetic recording disk of the present invention to be applied to a high-density recording, it is preferred that the particle size is small as mentioned above. At the same time, it is preferred that the powder has such magnetic characteristics that the saturation magnetization ($\sigma_s$) is generally at least 110 emu/g, preferably at least 120 emu/g, and that the coercive force is generally at least 800 Oe (oersted), preferably at least 900 Oe.

Non-metals such as B, C, Al, Si and P are optionally added to the composition to further improve the characteristics. Usually, an oxide layer is formed on the surfaces of the particles of the metallic powder to chemically stabilize the metallic powder.

The oxide can be formed by conventional gradual oxidizing treatment, for example, a method wherein the metallic powder is immersed in an organic solvent and then dried; a method wherein after the metallic powder is immersed in an organic solvent, an oxygen containing gas is introduced into the solution to form an oxide film on the surface of the metallic powder, and the powder is then dried; or a method wherein partial pressures of oxygen gas and an inert gas are controlled to form an oxide film on the surface of the metallic powder without using any organic solvent. Metallic powder treated by any of these methods can be used.

The above-described ferromagnetic hexagonal ferrite powder is a ferromagnetic powder which has a tabular form and an axis of easy magnetization in the direction perpendicular to the crystal plane. Specific examples of the ferromagnetic hexagonal ferrite powder include barium ferrite, strontium ferrite, lead ferrite, calcium ferrite and cobalt-substituted products thereof. Among them, cobalt-substituted barium ferrite and cobalt-substituted strontium ferrite are preferred. If desired, elements such as In, Zn, Ge, Nb and V may be optionally added thereto to improve their characteristics.

In order to enable the flexible magnetic disk of the present invention to be applied to high-density recording, it is preferred that the particle size of the hexagonal ferrite powder in the magnetic layer is small as mentioned above, and at the same time, the ferrite powder has such magnetic characteristics that saturation magnetization ($\sigma_s$) is generally at least 50 emu/g, preferably at least 53 emu/g, and that the coercive force is generally at least 500 Oe, preferably at least 600 Oe.

The magnetic characteristics, such as saturation magnetization and coercive force, of the ferromagnetic powder were measured at the maximum applied magnetic field of 10 kOe by using a vibrating sample type magnetometer ("VSM-III" manufactured by Toei Kogyo Co., Ltd.). The specific surface area was measured by the BET method using Quantarsorb (manufactured by Quantarchrom Co., Ltd.). The specific surface area is a value obtained by dehydrating a disc sample in a nitrogen atmosphere at 250° C. for 30 minutes and then measuring by BET single-point determination (partial pressure: 0.30).

It is preferred that the water content of these ferromagnetic powders is adjusted to 0.01 to 2% by weight. It is desirable that the water content is optimized according to the types of binder resins. It is also preferred that the pH of the ferromagnetic powder is optimized according to the binder resin used in combination of the ferromagnetic powder. The pH range is generally 4 to 12, preferably 5 to 10.

The surface of the ferromagnetic powder may be optionally treated with Al, Si, P or an oxide thereof. The amount of the treating agent is 0.1 to 10% by weight, based on the weight of the ferromagnetic powder. It is preferred that the ferromagnetic powder is subjected to the above-described surface treatment because when the surface treatment is carried out, the amount of the lubricant such as a fatty acid adsorbed thereby is not more than 100 mg/m². There is a possibility that the ferromagnetic powder contains soluble inorganic ions such as Na, Ca, Fe, Ni and Sr. However, when the amount of the ferromagnetic powder is not more than 500 ppm, the characteristics of the ferromagnetic powder are not seriously affected thereby.

If desired, iron oxide ferromagnetic powder may be used as the ferromagnetic powder. The specific surface area thereof is generally 25 to 80 m²/g, preferably 35 to 60 m²/g as measured by the BET method. When the specific surface area is lower than 25 m²/g, the amount of noise is increased, however, when the specific surface area is higher than 80 m²/g the desired surface properties are difficult to obtain. The crystallite size of the ferromagnetic powder determined by X-ray diffractometry is generally 450 to 100 Å, preferably 350 to 100 Å. The saturation magnetization ($\sigma_s$) of the ferromagnetic powder is generally at least 50 emu/g, preferably at least 70 emu/g.

These ferromagnetic powders may be previously treated with dispersant, lubricant, surfactant and antistatic agent, described hereinafter, before the ferromagnetic powders are dispersed. Specifically, the treatment is described in JP-B-44-14090.

Non-magnetic powder which can be used in the non-magnetic layer of the present invention include non-magnetic inorganic powder and non-magnetic organic powder.

Examples of the non-magnetic inorganic powder which can be used as the non-magnetic powder in the non-magnetic layer of the present invention include metals, metal oxides, metal carbonates, metal sulfates, metal nitrides, metal carbides and metal sulfides. Specific examples of the non-magnetic inorganic powder include $TiO_2$ (rutile, anatase), $TiO_x$, cerium oxide, tin oxide, tungsten oxide, ZnO, $ZrO_2$, $SiO_2$, $Cr_2O_3$, α-alumina having an alpha-conversion of at least 90%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, $CaSO_4$ and silicon carbide. These compounds may be used either alone or in combination. The shape and size of these inorganic powders are not critical. These powders may be in the form of a needle, a sphere or a die. These powders also may be used together with different inorganic powders. When these powders are used alone, the particle size distribution thereof can be chosen. The particle size is preferably 0.01 to 2 μm. Non-magnetic inorganic powders having the following properties are preferred.

Preferably, tap density (measured under the condition of number of tapping: 150 and head: 30 mm using Tap density measuring instrument manufactured by Seishin Enterprise Inc.) is 0.3 to 2 g/ml, water content is 0.1 to 5%, pH is 2 to 11, and specific surface area is 1 to 30 m²/g. DBP oil absorption is generally 5 to 100 mL/100 g, preferably 10 to 80 mL/100 g, more preferably 20 to 60 mL/100 g. It is not required that the above-described non-magnetic powders are always 100% pure. The surfaces of the non-magnetic powders may be optionally treated with other compounds, such as compounds of Al, Si, Ti, Zr, Sn, Sb and Zn, according to purpose, to form an oxide on the surfaces of the powders. In this case, the result is not affected, so long as the purity of the powder is not lower than 70%. It is preferred that ignition loss is not more than 20%.

More specifically, examples of the non-magnetic inorganic powder which can be used in the present invention include AKP-20, AKP-30 and AKP-50 (manufactured by Sumitomo Chemical Co., Ltd.); G5, G-7 and S-1 (manufactured by Nippon Chemical Industrial Co., Ltd.); TT055 series and ET300W (manufactured by Ishihara Sangyo Kaisha Ltd.); and STT30 (manufactured by Titan Kogyo KK).

Examples of the non-magnetic organic powder which can be used in the present invention include acrylic/styrene resin powder, benzoguanamine resin powder, melamine resin powder, phthalocyanine pigment, polyolefin resin powder, polyester resin powder, polyamide resin powder, polyimide resin powder and polyfluoroethylene resin powder. These organic powders can be prepared, for example, by the methods described in JP-A-62-18564 and JP-A-60-255827.

Examples of the binder which can be used in the magnetic layer and the non-magnetic layer of the present invention include conventional thermoplastic resins, thermosetting resins, reactive resins and mixtures thereof.

The thermoplastic resins include those having a glass transition temperature of generally from −100° to 150° C., a number-average molecular weight of generally 1,000 to 200,000, preferably 10,000 to 100,000, and a degree of polymerization of generally about 50 to 1,000. Specific examples of the thermoplastic resins include homopolymers and copolymers of vinyl chloride, vinyl acetate, vinyl alcohol, maleic acid, acrylic acid, acrylic esters, vinylidene chloride, acrylonitrile, methacrylic acid, methacrylic esters, styrene butadiene, ethylene, vinyl butyral, vinyl acetal and vinyl ether, polyurethane resin and various rubber resins.

Examples of the thermosetting resins or the reactive resins include phenolic resins, epoxy resins, polyurethane curing resins, urea resins, melamine resins, alkyd reins, reactive acrylic resins, formaldehyde resins, silicone resins, epoxy/polyamide resins, mixtures of polyester resins and isocyanate prepolymers, mixtures of polyester-polyols and polyisocyanates, and mixtures of polyurethane and polyisocyanates. These resins are described in detail in *Plastic Handbook* (Asakura Shoten).

Conventional electron beam curable resins can also be used in the non-magnetic layer or the magnetic layer. Examples of these resins and the preparation thereof are described in JP-A-62-256219.

The above-described resins may be used either alone or in combination. A combination of a polyurethane resin with at least one member selected from the group consisting of vinyl chloride resins, vinyl chloride/vinyl acetate resins, vinyl chloride/vinyl acetate/vinyl alcohol resins, vinyl chloride/vinyl acetate/maleic anhydride copolymers and nitrocellulose or a mixture of said combination with a polyisocyanate is preferred.

With regard to the structures of the polyurethane resins, any conventional resin such as polyester polyurethane, polyether polyurethane, polyether polyester polyurethane, polycarbonate polyurethane, polyester polycarbonate polyurethane and polycaprolactone polyurethane can be used. It is preferred that at least one polar group selected from the group consisting of —COOM, —$SO_3$M, —$OSO_3$M, —P=$O(OM)_2$ and —O—P=$O(OM)_2$ (wherein M is hydrogen atom or an alkali metal), —OH, $NR_2$, $N^+R_3$ (wherein R is a hydrocarbon group), epoxy group, —SH and —CN is optionally introduced into the binders by a copolymerization reaction or an addition reaction to further improve dispersibility and durability. The amount of the polar group is generally $1\times10^{-1}$ to $1\times10^{-8}$ mol/g, preferably $1\times10^{-2}$ to $1\times10^{-6}$ mol/g.

Specific examples of the binders which can be used in the present invention include VAGH, VYHH, VMCH, VAGH, VAGD, VROH, VYES, VYNC, VMCC, XYHL, XYSG, PKHH, PKHJ, PKHC and PKFE (manufactured by Union Carbide Co., Ltd.); MPR-TA, MRP-TA5, MPR-TAL, MRP-TSN, MRP-TMF, MPR-TS, MPR-TM and MPR-TAO (manufactured by Nissin Chemical Industry Co., Ltd.); 1000W, DX80, DX81, DX82, DX83 and 100FD (manufactured by Electro Chemical Industry Co., Ltd.); MR105, MR110, MR100 and 400X110A (manufactured by Nippon Zeon Co., Ltd.); Nippollan N2301, N2302 and N2304 (manufactured by Nippon Polyurethane Co., Ltd.); Pandex T-5105, T-R3080 and T-5201, Bernock D-400 and D-210-80 and Crisvon 6109 and 7209 (manufactured by Dainippon & Chemicals Inc.); Vylon UR8200, UR8300, UR8600, UR5500, UR4300, RV530 and RV280 (manufactured by Toyobo Co., Ltd.); Daipheramine 4020, 5020, 5100, 5300, 9020, 9022 and 7020 (manufactured by Dainichi Seika Co., Ltd.); MX5004 (manufactured by Mitsubishi Chemical Corp.); Sunprene SP-150 (manufactured by Sanyo Chemical Industries Co., Ltd.); and Salan F310 and F210 (manufactured by Asahi Chemical Industry Co., Ltd.).

The binders are used in an amount of generally 5 to 50% by weight, preferably 10 to 30% by weight based on the weight of the ferromagnetic powder used in the magnetic layer or based on the weight of the non-magnetic powder used in the non-magnetic layer. It is preferred that 5 to 100% by weight of a vinyl chloride resin and 2 to 50% by weight of a polyurethane resin are used in combination with 2 to 100% by weight of a polyisocyanate.

The polyurethane resins which can be preferably used in the present invention are those having a glass transition temperature of from −50 to 100° C., an elongation at break of 100 to 2000%, a breaking stress of 0.05 to 10 kg/cm$^2$ and a yield point of 0.05 to 10 kg/cm$^2$.

The magnetic recording disk of the present invention comprises basically two layers, one being the non-magnetic layer and the other being the magnetic layer. Each of the non-magnetic layer and the upper (magnetic) layer may be composed of two or more layers. The compositions of the coating solutions for these layers may be the same or different, and the type and size of the powders can be properly chosen. These coating solutions can be coated by the wet-on-wet coating system in the manner described above.

The amount of the binder, the amounts of the vinyl chloride resin, polyurethane resin, polyisocyanate and other resins in the binder, the molecular weight of each resin for forming the magnetic layer and the amount of the polar group which are used in the coating solutions can be properly varied, for example, by taking the above-described physical properties of the resins into consideration.

Examples of the polyisocyantes which can be used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; reaction products of these isocyanates with polyalcohol; and polyisocyanates formed through the condensation of isocyanates. Examples of these isocyanates which are commercially available include Coronate L, Coronate HL, Coronate 2030, Coronate 2031, Millionate MR and Millionate MTL (manufactured by Nippon Polyurethane Co., Ltd.); Takenate D-102, Takenate D-110N, Takenate D-200 and Takenate D-202 (manufactured by Takeda Chemical Industries Co., Ltd.); and Desmodure L, Desmodure IL, Desmodure N and Desmodure HL (manufactured by Sumitomo Bayer Co., Ltd.). These compounds may be used either alone or in combination of two or more, by using a difference in curing reactivity in each layer.

Examples of abrasives which can be used in the non-magnetic layer or the magnetic layer of the present invention include conventional materials having a Mohs' hardness of at least 5, such as α-alumina having an alpha-conversion of at least 90%, β-alumina, silicon carbide, chromium oxide, cerium oxide, α-iron oxide, corundum, synthetic corundum, emery (a composite mineral mainly composed of corundum and magnetite), artificial diamond, silicon nitride, silicon carbide, titanium carbide, titanium oxide, silicon dioxide and boron nitride. These materials may be used either alone or in combination. Further, composite materials of these abrasives (obtained by treating the surfaces of these abrasives with other abrasives) may be used. There is the case where these abrasives contain compounds other than-the principal compound or elements other than the principal ingredients. However, when the abrasives contain at least 90% of the principal component, the effect thereof is not adversely changed.

Abrasives having an average particle size of 0.05 to 5 μm, preferably 0.2 to 1.0 μm are effective. If desired, a combination of abrasives having different particle sizes may be used. Further, when an abrasive is used alone, the particle size distribution thereof may be widened to thereby give a similar effect to that of the composite material. Preferably, the tap density of the abrasive is 0.3 to 2 g/ml, the water content is 0.1 to 5%, the pH is 2 to 11, and the specific surface area is 1 to 30 m$^2$/g. The abrasives of the present invention can be in any suitable form, such as, for example, a needle, a sphere or a die (like cube).

These abrasives preferably are used in an amount of 3 to 20 parts by weight per 100 parts by weight of the binder used in each of the non-magnetic layer and the magnetic layer.

When the amount of the abrasive is less than 3 parts by weight, sufficient durability can not be obtained. When the amount is more than 20 parts by weight, the packing degree is reduced, and a sufficient output can not be obtained.

The amounts and types of these abrasives can vary depending on the amounts and types of the non-magnetic powder contained in the non-magnetic layer and depending on the amounts and types of the ferromagnetic powder contained in the upper and lower layers of the magnetic layer and according to desired result. For example, when the durability of the surface of the magnetic layer is to be improved, the amount of the abrasive in the non-magnetic layer is increased. Further, when the durability of the edge face of the magnetic layer is to be improved, the amount of the abrasive in the magnetic layer is increased. These abrasives are previously dispersed in the binder and then may be added to the magnetic coating or the non-magnetic coating. The amount of the abrasive present on the surface and edge face of the magnetic layer of the magnetic recording disk of the present invention is preferably at least 5 particles/100 μm$^2$.

Specific examples of the abrasives which can be used in the present invention include AKP-20, AKP-30, AKP-50 and HIT-50 (manufactured by Sumitomo Chemical Co., Ltd.); G5, G7 and S-1 (manufactured by Nippon Chemical Industrial Co., Ltd.); and TF-100, TF-140, 100ED and 140ED (manufactured by Toda Kogyo Co., Ltd.).

Examples of dispersants (pigment wetting agents) which can be used in the present invention include fatty acids having 12 to 18 carbon atoms ($R_1COOH$, wherein $R_1$ is an alkyl or alkenyl group having 11 to 17 carbon atoms) such as caprylic acid, capric acid, lauric acid, myristic acid, palmitic acid, stearic acid, behenic acid, oleic acid, elaidic acid, linolic acid, linolenic acid and stearolic aid; metallic soap comprising alkali metal salts (e.g., Li, Na, K salts) or alkaline earth metal salts (e.g., Mg, Ca, Ba salts) of the above fatty acids; fluorinated compounds of esters of the above fatty acids; amides of the above fatty acids; polyalkylene oxide alkyl phosphates; lecithin; and trialkylpolyolefinoxy quaternary ammonium salts (wherein the alkyl group has 1 to 5 carbon atoms and wherein the olefin includes ethylene and propylene). In addition thereto, sulfuric esters and higher alcohols having not less than 12 carbon atoms can be used. These dispersants are generally used in an amount of 0.5 to 20 parts by weight per 100 parts by weight of the binder resin.

Examples of lubricants which can be used in the present invention include silicone oil such as dialkylpolysiloxanes (wherein the alkyl group has 1 to 5 carbon atoms), dialkoxypolysiloxanes (wherein the alkoxy group has 1 to 4 carbon atoms), monoalkylmonoalkoxylpolysiloxanes (wherein the alkyl group has 1 to 5 carbon atoms and the alkoxy group has 1 to 4 carbon atoms), phenylpolysiloxane and fluoroalkylpolysiloxanes (wherein the alkyl group has 1 to 5 carbon atoms); electrically conductive fine powder such as graphite; inorganic powder such as molybdenum disulfide and tungsten disulfide; fine powder of plastics such as polyethylene, polypropylene, poly(ethylene/vinyl chloride) copolymer and polytetrafluoroethylene; α-olefin polymers; unsaturated aliphatic hydrocarbons (compounds wherein the n-olefinic double bond is bonded to the terminal carbon atom and wherein the number of carbon atoms is about 20) which are liquid at room temperature; fatty acid esters derived from both monobasic fatty acids having 12 to 20 carbon atoms and monohydric alcohols having 3 to 12 carbon atoms; and fluorocarbons.

Among them, the fatty acid esters are most preferred.

Examples of the alcohols which can be used in the preparation of the fatty acid esters include monohydric alcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether and s-butyl alcohol; and polyhydric alcohols such as ethylene glycol, diethylene glycol, neopentyl alcohol, glycerin and sorbitan derivatives.

Examples of the fatty acids which can be used in the preparation of the fatty acid esters include aliphatic carboxylic acids such as acetic acid, propionic acid, octoic acid, 2-ethylhexoic acid, lauric acid, myristic acid, stearic acid, palmitic acid, behenic acid, arachic acid, oleic acid, linoleic acid, linolenic acid, elaidic acid, palmitoleic acid or a mixture thereof.

Specific examples of the fatty acid esters include butyl stearate, s-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, butoxyethyl stearate, 2-butoxy-1-propyl stearate, a product obtained by acylating dipropylene glycol monobutyl ether with stearic acid, diethylene glycol dipalmitate, an ester obtained by acylating hexamethylene diol with myristic acid and glycerol oleate.

Further, the isomeric structure and branched position (e.g., branched/straight chain, cis/trans) of the starting fatty acids and alcohols can be properly chosen to reduce the occurrence of hydrolysis of the fatty acid esters which often occurs when the magnetic recording disk is used under high humidity conditions.

In addition to the above-described lubricants, there can be used, as lubricants, compounds such as silicone oil, graphite, molybdenum disulfide, boron nitride, fluorinated graphite, fluorinated alcohols, polyolefins, polyglycols, alkylsulfuric esters and tungsten disulfide.

These lubricants are used in an amount of 0.2 to 20 parts by weight per 100 parts by weight of the binder resin.

The lubricant of the present invention can be properly used in the magnetic layer and the non-magnetic layer by varying the types and amounts thereof. For example, fatty acids having different melting points can be used in the non-magnetic layer and the magnetic layer, respectively to thereby control the oozing of the lubricant onto the surface of the magnetic layer. Esters having different boiling points or different polarity are used respectively to control the oozing thereof onto the surface of the magnetic layer or the non-magnetic layer. The amount of the lubricant added to the non-magnetic layer is increased to improve a lubricating effect. In addition, various embodiments can be considered.

All or a part of the additives which are used in the present invention may be added at any stage during the course of the preparation of the coating solution for the magnetic layer or the coating solution for the non-magnetic layer. For example, all or a part of the additives may be mixed with the ferromagnetic powder before the kneading stage, or may be added at the stage of adding the ferromagnetic powder to the binder and the solvent, or may be added during dispersion or after dispersion, or may be added just before coating.

Examples of the lubricants which are commercially available and can be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor oil-hardened fatty acids, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion 0-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate and erucic acid (manufactured by Nippon Oils & Fats Co., Ltd.); oleic acid (manufactured by Kanto Chemical Co., Ltd.); FAL-205 and FAL-123 (manufactured by Takemoto Yushi Co., Ltd.); Enujerubu LO, Enujerubu IPM and Sansosyzer E4030 (manufactured by Shin Nippon Rika Co., Ltd.); TA-3, KF-96, KF-96L, KF-96H, KF410, KF420, KF965, KF54, KF50, KF56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910 and KF-3935 (manufactured by Shin-Etsu Chemical Co., Ltd.); Armide F, Armide C and Armoslip CP (manufactured by Lion Armour Co., Ltd.); Duomin IDO (manufactured by Lion Fat & Oil Co., Ltd.); BA-41G (manufactured by Nisshin Oil Mills Co., Ltd.); Profan 2012E, Newpole PE61, Ionet MS-400, Ionet MO-200, Ionet DL-200, Ionet DS-300, Ionet DS-1000 and Ionet DO-200 (manufactured by Sanyo Chemical Co., Ltd.).

The non-magnetic support of the present invention may be previously subjected to a corona discharge treatment, a plasma treatment, an adhesion treatment, a heat treatment or a dust-removing treatment. It is preferred that the non-magnetic support having a center line average surface roughness ($R_a$) (cut off value: 0.25 mm) of generally not more than 0.03 μm, preferably not more than 0.02 μm, more preferably not more than 0.01 μm is used to achieve the objects of the present invention. Further, it is preferred that the non-magnetic support of the present invention have in addition to a small center line average surface roughness, no coarse protrusion of 1 μm or above. The form of the surface roughness can be arbitrarily controlled by the size and amount of a filler which is optionally added to the support. Examples of the filler include fine powders of oxides and carbonates of Ca, Si and Ti and acrylic organic fine powders.

The F-5 (i.e., the load at the 5% elongation) value of the non-magnetic powder of the present invention in the web traveling direction (in the lengthwise direction) thereof is preferably 5 to 50 kg/mm$^2$. The F-5 value in the web width direction is preferably 3 to 30 kg/mm$^2$. Generally, the F-5 value in the web length direction is higher than that in the web width direction. However, when the strength in the crosswise direction in particular is to be increased, the F-5 value in the width direction may be higher than that in the lengthwise direction.

The heat shrinkage ratio of the non-magnetic support in the web traveling direction and in the width direction is preferably not more than 3%, more preferably not more than 1.5% at 100° C. for 30 minutes. The heat shrinkage ratio at 80° C. for 30 minutes is preferably not more than 1%, more preferably not more than 0.5%. The breaking strength thereof in the lengthwise direction as well as in the width direction is preferably 5 to 100 kg/mm$^2$.

Stages for preparing the coating solution for the magnetic layer of the magnetic recording disk of the present invention and the coating solution for the non-magnetic layer thereof, comprise at least a kneading stage, a dispersion stage and optionally a mixing stage, which is provided before or after the kneading stage and the dispersion stage. Each stage may be composed of two or more stages. All of the raw materials such as the ferromagnetic powder, the non-magnetic powder, the binder, carbon black, the abrasive, the antistatic agent, the lubricant and the solvent may be added at the beginning of the preparation of the coating solution, or they may be added one by one during the preparation. If desired, individual additives may be added portionwise to two or more stages. For example, the polyurethane resin may be added portionwise to the kneading stage, the dispersion stage and the mixing stage for adjusting the viscosity of the mixture after dispersion.

Various kneaders can be used in the kneading and dispersion steps for the preparation of the coating solutions. Examples of the kneaders which can be used in the present invention include two-roll mill, three-roll mill, ball mill, pebble mill, Trommel mill, sand grinder, Szegvari, attritor, high-speed impeller, dispersing machine, high-speed stone mill, high-speed impact mill, disper, kneader, high-speed mixer, homogenizer and supersonic dispersing machine.

Conventional preparation techniques can be used as a part of the stages to achieve the objects of the present invention. A kneader having an intensive kneading force such as a continuous kneader or a pressure kneader can be used in the kneading stage, whereby a magnetic recording disk having a high Br content can be obtained. When a continuous kneader or a pressure kneader is used, all or a part (preferably at least 30% by weight of the entire binder) of the binder is kneaded in an amount of 15 to 500 parts per 100 parts of ferromagnetic powder. The details of the kneading treatment are described in JP-A-1-106338 and JP-A-64-79274. When the coating solution for the non-magnetic layer is prepared, it is desirable that a dispersion medium having a high specific gravity, such as zirconia beads or metal beads, is used.

It is preferred that the non-magnetic layer and the magnetic layer coated by the wet-on-wet coating system are calendered through an orientation treatment and a drying stage. As calendering rolls, heat-resistant plastic rolls prepared from epoxy resin, polyimide, polyamide or polyimide-amide are used. Further, the calendering treatment can be carried out by using metal rolls. The treating temperature is preferably not lower than 70° C., more preferably not lower than 80° C. The linear pressure is preferably not lower than 200 kg/cm, more preferably not lower than 300 kg/cm.

The heat shrinkage ratio of the flexible magnetic disk of the present invention at a temperature of not higher than 100° C. is preferably not more than 1%, more preferably not more than 0.5%, most preferably not more than 0.1%.

The amount of the solvent left behind in the magnetic layer is preferably not more than 100 mg/m$^2$, more preferably not more than 10 mg/m$^2$. It is preferred that the amount of the solvent left behind in the magnetic layer is smaller than the amount of the solvent left behind in the non-magnetic layer. The magnetic layer and the non-magnetic layer each has a void volume of preferably not more than 30% by volume, more preferably not more than 10% by volume. It is preferred that the void volume of the non-magnetic layer is larger than the void volume of the magnetic layer. However, if the non-magnetic layer has a void volume of at least 5% by volume, the void volume of the non-magnetic layer may be smaller than the void volume of the magnetic layer.

The magnetic layer coated on the support by the wet-on-wet coating system is optionally subjected to a treatment wherein ferromagnetic powder in the magnetic layer is orientated, and the magnetic layer is then dried. If desired, the magnetic layer is subjected to a surface smoothing treatment, or is cut into a desired shape to prepare the magnetic recording medium of the present invention.

The magnetic recording disk of the present invention enables high-density recording to be made. In the magnetic recording disk of the present invention, head touch characteristics required for digital data recording mediums used in the storage and read-out of computer information are improved. Further, electromagnetic characteristics such as overwrite characteristics and reproducing output can be stably obtained without lowering, even when high-density recording is made using a short recording wavelength of 1.5 μm or below. In addition, running durability is not adversely affected.

When the magnetic recording disk of the present invention is used, it is possible to produce a recording which scarcely causes crosstalk signals and is excellent in the selectivity of peak shift. This is true not only in the case where the recording wavelength is short-waved but also in the case where track density is increased. Accordingly, even when a recording with a recording wavelength of 1.5 μm or shorter is made under such conditions that the width of the recording track is 50 μm or less and the track density is 14 tracks/mm or more, recording and reproduction with excellent overwriteability and good running durability can be made.

The present invention is now illustrated in greater detail by reference to the following examples. It should be understood that components, proportions, working order, etc. can be changed within the scope of the present invention. Accordingly, it should be noted that the following examples are not to be construed as limiting the present invention in any way. In the following examples, all parts are by weight.

EXAMPLE 1

A coating composition for a non-magnetic layer and a coating composition for a magnetic layer were prepared by using the following ingredients.

| Coating composition for the non-magnetic layer | |
|---|---|
| Non-magnetic inorganic powder TiO$_2$ ("TY 50" manufactured by Ishihara Sangyo Kaisha Ltd.) | 90 parts |
| Average particle size: | 0.34 μm |
| Specific surface area (BET): | 5.9 m$^2$/g |
| pH: | 5.9 |
| Carbon black (Ketjen black EC manufactured by Lion Akzo Co., Ltd.) | 10 parts |
| Average particle size: | 30 mμ |
| DBP oil absorption: | 350 mL/100 g |
| Specific surface area (BET): | 950 m$^2$/g |
| Vinyl chloride-vinyl acetate-vinyl alcohol copolymer | 14 parts |
| —N(CH$_3$)$_3$$^+$Cl$^-$ group content: | 5 × 10$^{-6}$ eq/g |
| Composition ratio = 86:13:1 | |
| Degree of polymerization: | 400 |
| Polyester polyurethane resin Neopentyl glycol/caprolactone polyol/MDI = 0.9/2.6/1 (by mol) | 5 parts |
| —SO$_3$Na group content: | 1 × 10$^{-4}$ eq/g |
| sec-Butyl stearate | 5 parts |
| 2-Butoxy-1-ethyl stearate | 5 parts |
| Oleic acid | 1 part |
| Methyl ethyl ketone | 200 parts |
| Coating composition for the magnetic layer | |
| Ferromagnetic fine metallic powder Composition: Fe/Ni = 96/4 | 100 parts |
| Hc: | 1600 Oe |
| Specific surface area (BET): | 58 m$^2$/g |
| Crystallite size: | 195Å |
| Average particle size (length of major axis): | 0.20 μm |
| Acicular ratio: | 10 |
| Saturation magnetization (σ$_s$): | 130 emu/g |
| Vinyl chloride copolymer | 14 parts |
| —SO$_3$Na group content: | 1 × 10$^{-4}$ eq/g |
| Degree of polymerization: | 300 |
| Polyester polyurethane resin Neopentyl glycol/caprolactone polyol/MDI = 0.9/2.6/1 (by mol) | 3 parts |
| —SO$_3$Na group content: | 1 × 10$^{-4}$ eq/g |
| α-Alumina | 2 parts |
| Average particle size: | 0.3 μm |
| Carbon black | 0.5 parts |
| Average particle size: | 0.10 μm |
| Isohexadecyl stearate | 6 parts |
| Oleic acid | 2 parts |
| Methyl ethyl ketone | 200 parts |

The above ingredients of each of the above compositions were kneaded in continuous kneader and then dispersed in a sand mill. To the resulting dispersion for the non-magnetic layer, 10 parts of polyisocyanate (Coronate L manufactured by Nippon Polyurethane Co., Ltd. ) were added. To the resulting dispersion for the magnetic layer, 12 parts of polyisocyanate (Coronate L) were added. To each of the resulting mixtures, 40 parts of butyl acetate were added. The resulting mixture was filtered through a filter having an average pore size of 1 μm to prepare the coating composition for the non-magnetic layer and the coating composition for the magnetic layer.

The resulting coating compositions were coated on a 62 μm thick polyethylene terephthalate support having a center line average surface roughness of 0.01 μm (Young's modulus: 480 kg/mm$^2$ in the lengthwise direction and 450 kg/mm$^2$ in the crosswise direction) by means of simultaneous multiple layered coating method in such a way that the coating composition for the non-magnetic layer was coated in such an amount as to give a dry thickness of 2 μm. Immediately thereafter, the coating composition for the magnetic layer was coated thereon in such an amount as to give a dry thickness of 0.45 μm. While both layers were still in a wet state, the coated support was passed through an AC magnetic field generating device having two magnetic field intensities (magnetic field intensity: 200 gauss at a frequency of 50 Hz, and magnetic field intensity: 120 gauss at a frequency of 50 Hz) to carry out a random orientation treatment. After drying, the resulting material was treated at a temperature of 90° C. under a linear pressure of 300 kg/cm by using a 7-stage calendering equipment. A 3.5-inch disk was punched therefrom, subjected to a surface-smoothing treatment and placed in a 3.5-inch cartridge provided with a liner. A center core having a diameter of 2.9 mm and other components were set to obtain a 3.5-inch floppy disk.

EXAMPLE 2

A 3.5-inch floppy disk was prepared in the following manner by using the following coating composition for the magnetic layer in place of the coating composition for the magnetic layer used in Example 1.

| Coating composition for the magnetic layer | |
|---|---|
| Ferromagnetic hexagonal ferrite powder | 100 parts |
| Hc: | 1400 Oe |
| Specific surface area (BET): | 45 m$^2$/g |
| Average particle size (tabular diameter): | 0.06 μm |
| Tabular ratio: | 5.2 |
| Saturation magnetization (σ$_s$): | 65 emu/g |
| Vinyl chloride copolymer | 12 parts |
| —SO$_3$Na group content: | 1 × 10$^{-4}$ eq/g |
| Polyester polyurethane resin Neopentyl glycol/caprolactone polyol/MDI = 0.9/2.6/1 (by mol) | 3 parts |
| —SO$_3$Na group content: | 1 × 10$^{-4}$ eq/g |
| α-Alumina "AKP-30" manufactured by Sumitomo Chemical Co., Ltd. | 10 parts |
| Average particle size: | 0.2 μm |
| Specific surface area: | 7.5 m$^2$/g |
| Isohexadecyl stearate | 6 parts |
| Oleic acid | 2 parts |
| Methyl ethyl ketone | 200 parts |

The ingredients of the coating composition for the non-magnetic layer used in Example 1 and the above coating composition for the magnetic layer were kneaded in a continuous kneader and dispersed in a sand mill. To the resulting dispersion for the non-magnetic layer, 10 parts of polyisocyanate (Coronate L) were added. To the resulting dispersion for the magnetic layer, 9 parts of polyisocyanate (Coronate L) were added. To each of the resulting mixtures, 40 parts of butyl acetate were added. The resulting mixture was filtered through a filter having an average pore size of 1 μm to prepare a coating composition for the non-magnetic layer and a coating solution for the magnetic layer.

The resulting coating compositions were coated on a 62 μm thick polyethylene terephthalate support having a center line average surface roughness of 0.01 μm (Young's modulus: 480 kg/mm² in the lengthwise direction and 450 kg/mm² in the-crosswise direction) by means of a wet simultaneous multiple layered coating method according to the wet-on-wet coating system, in such a way so that the coating composition for the non-magnetic layer gave a dry thickness of 2 μm. Immediately thereafter, the coating composition for the magnetic layer was coated on the non-magnetic layer in such an amount so as to give a dry thickness of 0.5 μm. While both layers were still in a wet state, the coated support was passed between permanent magnets to carry out perpendicular orientation. These permanent magnets were placed on the upper and lower sides of both layers in a direction perpendicular to the coated surface so that the magnetic field intensity was 3000 G on the vertical surface.

After drying, the resulting material was treated at a temperature of 90° C. under a linear pressure of 300 kg/cm by using a 7-stage calendering equipment. A 3.5-inch disk was punched therefrom, subjected to a surface-smoothing treatment and placed in a 3.5-inch cartridge provided with a liner. Required components were set to obtain a 3.5-inch floppy disk.

EXAMPLE 3

A 3.5-inch floppy disk was prepared in the same manner as in Example 1, except that the following support was used in place of the non-magnetic support used in Example 1.

| Polyethylene terephthalate support | |
|---|---|
| Thickness: | 62 μm |
| Young's modulus: | 640 kg/mm² in the lengthwise direction and 560 kg/mm² in the crosswise direction |

EXAMPLE 4

A 3.5-inch floppy disk was prepared in the same manner as in Example 1, except that the following support was used in place of the non-magnetic support used in Example 1.

| Polyethylene terephthalate support | |
|---|---|
| Thickness: | 50 μm |
| Young's modulus: | 480 kg/mm² in the lengthwise direction and 450 kg/mm² in the crosswise direction |

EXAMPLE 5

A 3.5-inch floppy disk was prepared in the same manner as in Example 1, except that the following support was used in place of the non-magnetic support used in Example 1.

| Polyethylene terephthalate support | |
|---|---|
| Thickness: | 62 μm |
| Young's modulus: | 650 kg/mm² in the lengthwise direction and 690 kg/mm² in the crosswise direction |

EXAMPLE 6

A 3.5-inch floppy disk was prepared in the same manner as in Example 1, except that the following support was used in place of the non-magnetic support used in Example 1.

| Polyimide support | |
|---|---|
| Thickness: | 62 μm |
| Young's modulus: | 390 kg/mm² in the lengthwise direction and 340 kg/mm² in the crosswise direction |

EXAMPLE 7

A 3.5-inch floppy disk was prepared in the same manner as in Example 1, except that the following support was used in place of the non-magnetic support used in Example 1.

| Polyimide support | |
|---|---|
| Thickness: | 72 μm |
| Young's modulus: | 390 kg/mm² in the lengthwise direction and 340 kg/mm² in the crosswise direction |

EXAMPLE 8

A 3.5-inch floppy disk was prepared in the same manner as in Example 1, except that the following support was used in place of the non-magnetic support used in Example 1.

| Polyaramid support | |
|---|---|
| Thickness: | 35 μm |
| Young's modulus: | 1350 kg/mm² in the lengthwise direction and 1300 kg/mm² in the crosswise direction |

EXAMPLE 9

A 3.5-inch floppy disk was prepared in the same manner as in Example 1, except that the following support was used in place of the non-magnetic support used in Example 1.

| Syndiotactic polystyrene support | |
|---|---|
| Thickness: | 72 μm |
| Young's modulus: | 390 kg/mm² in the lengthwise direction and 420 kg/mm² in the crosswise direction |

EXAMPLE 10

A 3.5-inch floppy disk was prepared in the same manner as in Example 1, except that the following support was used in place of the non-magnetic support used in Example 1.

| Syndiotactic polystyrene support | |
|---|---|
| Thickness: | 62 μm |
| Young's modulus: | 390 kg/mm² in the lengthwise direction and 420 kg/mm² in the crosswise direction |

EXAMPLE 11

A 3.5-inch floppy disk was prepared in the same manner as in Example 2, except that the following support was used in place of the non-magnetic support used in Example 2.

| Polyethylene terephthalate support | |
|---|---|
| Thickness: | 62 μm |
| Young's modulus: | 640 kg/mm² in the lengthwise direction and 560 kg/mm² in the crosswise direction |

EXAMPLE 12

A 3.5-inch floppy disk was prepared in the same manner as in Example 2, except that the following support was used in place of the non-magnetic support used in Example 2.

| Polyethylene terephthalate support | |
|---|---|
| Thickness: | 50 μm |
| Young's modulus: | 480 kg/mm² in the lengthwise direction and 450 kg/mm² in the crosswise direction |

EXAMPLE 13

A 3.5-inch floppy disk was prepared in the same manner as in Example 2, except that the following support was used in place of the non-magnetic support used in Example 2.

| Polyethylene naphthalate support | |
|---|---|
| Thickness: | 62 μm |
| Young's modulus: | 650 kg/mm² in the lengthwise direction and 690 kg/mm² in the crosswise direction |

EXAMPLE 14

A 3.5-inch floppy disk was prepared in the same manner as in Example 2, except that the following support was used in place of the non-magnetic support used in Example 2.

| Polyimide support | |
|---|---|
| Thickness: | 62 μm |
| Young's modulus: | 390 kg/mm² in the lengthwise direction and 340 kg/mm² in the crosswise direction |

EXAMPLE 15

A 3.5-inch floppy disk was prepared in the same manner as in Example 2, except that the following support was used in place of the non-magnetic support used in Example 2.

| Polyimide support | |
|---|---|
| Thickness: | 72 μm |
| Young's modulus: | 390 kg/mm² in the lengthwise direction and 340 kg/mm² in the crosswise direction |

EXAMPLE 16

A 3.5-inch floppy disk was prepared in the same manner as in Example 2, except that the following support was used in place of the non-magnetic support used in Example 2.

| Polyaramid support | |
|---|---|
| Thickness: | 35 μm |
| Young's modulus: | 1350 kg/mm² in the lengthwise direction and 1300 kg/mm² in the crosswise direction |

EXAMPLE 17

A 3.5-inch floppy disk was prepared in the same manner as in Example 2, except that the following support was used in place of the non-magnetic support used in Example 2.

| Syndiotactic polystyrene support | |
|---|---|
| Thickness: | 72 μm |
| Young's modulus: | 390 kg/mm² in the lengthwise direction and 420 kg/mm² in the crosswise direction |

EXAMPLE 18

A 3.5-inch floppy disk was prepared in the same manner as in Example 2, except that the following support was used in place of the non-magnetic support used in Example 2.

| Syndiotactic polystyrene support | |
|---|---|
| Thickness: | 62 μm |
| Young's modulus: | 390 kg/mm² in the lengthwise direction and 420 kg/mm² in the crosswise direction |

COMPARATIVE EXAMPLE 1

A 3.5-inch floppy disk was prepared in the same manner as in Example 1, except that the following support was used in place of the non-magnetic support used in Example 1.

| Polyethylene terephthalate support | |
|---|---|
| Thickness: | 72 μm |
| Young's modulus: | 480 kg/mm$^2$ in the lengthwise direction and 450 kg/mm$^2$ in the crosswise direction |

COMPARATIVE EXAMPLE 2

A 3.5-inch floppy disk was prepared in the same manner as in Example 1, except that the following support was used in place of the non-magnetic support used in Example 1.

| Polyethylene terephthalate support | |
|---|---|
| Thickness: | 40 μm |
| Young's modulus: | 480 kg/mm$^2$ in the lengthwise direction and 450 kg/mm$^2$ in the crosswise direction |

COMPARATIVE EXAMPLE 3

A 3.5-inch floppy disk was prepared in the same manner as in Example 1, except that the following support was used in place of the non-magnetic support used in Example 1.

| Polyethylene naphthalate support | |
|---|---|
| Thickness: | 35 μm |
| Young's modulus: | 650 kg/mm$^2$ in the lengthwise direction and 690 kg/mm$^2$ in the crosswise direction |

COMPARATIVE EXAMPLE 4

A 3.5-inch floppy disk was prepared in the same manner as in Example 1, except that the following support was used in place of the non-magnetic support used in Example 1.

| Polyethylene naphthalate support | |
|---|---|
| Thickness: | 73 μm |
| Young's modulus: | 650 kg/mm$^2$ in the lengthwise direction and 690 kg/mm$^2$ in the crosswise direction |

COMPARATIVE EXAMPLE 5

A 3.5-inch floppy disk was prepared in the same manner as in Example 1, except that the following support was used in place of the non-magnetic support used in Example 1.

| Polyimide support | |
|---|---|
| Thickness: | 73 μm |
| Young's modulus: | 390 kg/mm$^2$ in the lengthwise direction and 340 kg/mm$^2$ in the crosswise direction |

COMPARATIVE EXAMPLE 6

A 3.5-inch floppy disk was prepared in the same manner as in Example 1, except that the following support was used in place of the non-magnetic support used in Example 1.

| Polyaramid support | |
|---|---|
| Thickness: | 62 μm |
| Young's modulus: | 1350 kg/mm$^2$ in the lengthwise direction and 1300 kg/mm$^2$ in the crosswise direction |

COMPARATIVE EXAMPLE 7

A 3.5-inch floppy disk was prepared in the same manner as in Example 2, except that the amount of carbon black used in the coating composition for the non-magnetic layer was changed from 10 parts to 5 parts, and the amount of cyclohexanone was changed from 400 parts to 350 parts.

COMPARATIVE EXAMPLE 8

A 3.5-inch floppy disk was prepared in the same manner as in Example 2, except that the following support was used in place of the non-magnetic support used in Example 2.

| Polyethylene terephthalate support | |
|---|---|
| Thickness: | 40 μm |
| Young's modulus: | 480 kg/mm$^2$ in the lengthwise direction and 450 kg/mm$^2$ in the crosswise direction |

COMPARATIVE EXAMPLE 9

A 3.5-inch floppy disk was prepared in the same manner as in Example 2, except that the following support was used in place of the non-magnetic support used in Example 2.

| Polyethylene terephthalate support | |
|---|---|
| Thickness: | 35 μm |
| Young's modulus: | 650 kg/mm$^2$ in the lengthwise direction and 690 kg/mm$^2$ in the crosswise direction |

COMPARATIVE EXAMPLE 10

A 3.5-inch floppy disk was prepared in the same manner as in Example 2, except that the following support was used in place of the non-magnetic support used in Example 2.

| Polyethylene naphthalate support | |
|---|---|
| Thickness: | 73 μm |
| Young's modulus: | 650 kg/mm$^2$ in the lengthwise direction and 690 kg/mm$^2$ in the crosswise direction |

COMPARATIVE EXAMPLE 11

A 3.5-inch floppy disk was prepared in the same manner as in Example 2, except that the following support was used in place of the non-magnetic support used in Example 2.

| Polyimide support | |
|---|---|
| Thickness: | 73 μm |
| Young's modulus: | 390 kg/mm$^2$ in the lengthwise direction and 340 kg/mm$^2$ in the crosswise direction |

COMPARATIVE EXAMPLE 12

A 3.5-inch floppy disk was prepared in the same manner as in Example 2, except that the following support was used in place of the non-magnetic support used in Example 2.

| Polyaramid support | |
|---|---|
| Thickness: | 62 μm |
| Young's modulus: | 1350 kg/mm$^2$ in the lengthwise direction and 1300 kg/mm$^2$ in the crosswise direction |

EXAMPLE 19

A 3.5-inch floppy disk was prepared in the same manner as in Example 1, except that the thickness of the magnetic layer was 0.9 μm.

EXAMPLE 20

A 3.5-inch floppy disk was prepared in the same manner as in Example 2, except that the thickness of the magnetic layer was 0.9 μm.

EXAMPLE 21

A 3.5-inch floppy disk was prepared in the same manner as in Example 1, except that the amount of carbon black ("Ketjen black EC" manufactured by Lion Akzo Co., Ltd.) used in the non-magnetic layer was changed from 10 parts to 5 parts.

EXAMPLE 22

A 3.5-inch floppy disk was prepared in the same manner as in Example 2, except that the amount of carbon black ("Ketjen black EC" manufactured by Lion Akzo Co., Ltd.) was changed from 10 parts to 5 parts.

EXAMPLE 23

A 3.5-inch floppy disk was prepared in the same manner as in Example 1, except that a center core having a diameter of 31 mm was used in-place of the center core used as a component of the 3.5-inch floppy disk of Example 1.

Each sample of the thus-obtained floppy disks was evaluated in the following manner.

1. Ratio of degree of orientation

A vibrating sample type magnetometer ("VSM-III" manufactured by Toei Kogyo Co., Ltd.) was used. A magnetic field having Hm of 10 kOe was applied to the sample to be measured, and the magnetic field was rotated at an angle of from zero degrees to 360 degrees at intervals of 10 degrees to determine the squareness ratio. A value obtained by dividing the minimum squareness ratio by the maximum squareness ratio is referred to as the ratio of orientation degree.

2. Measurement of reproducing output

The measurement of reproducing output was made by using the disk testing equipment ("SK 606B" manufactured by Tokyo Engineering Co., Ltd.) and a metal-in-gap head having a gap length of 0.45-μm under such conditions that track width was 40 μm. At a position of 24.6 mm radius, the head was pushed up by 100 μm from a position at which the magnetic disk touched the head in a flat state, recording was made at a recording frequency of 625 kHz, and the reproducing output of the head amplifier was measured with an oscilloscope (manufactured by Techtronics Co., Ltd.).

The mean value, the maximum value and the minimum value of the reproducing output were calculated by the measuring method of JIS-X6221. In Examples 3 to 10, Comparative Examples 1 to 6, Example 19 and Example 21, the reproducing output in terms of relative value is shown in Tables 2 and 3 when the output in Example 1 is set at 100. In Examples 11 to 18, Comparative Examples 7 to 12, Example 20 and Example 22, the reproducing output in terms of relative value is shown in Tables 2 and 3 when the reproducing output in Example 2 is set at 100.

3. Overwrite characteristics

The above-described testing equipment was used in the measurement of overwrite characteristics. At a position of 39.5-mm radius, recording at a frequency of 312.5 kHz was made on a disc sample demagnetized by an alternating current. The output 01 (dB) of the 312.5 kHz component was measured with a spectrum analyzer (manufactured by Advantest Co., Ltd.). Immediately thereafter, recording at a frequency of 1 MHz was overwritten thereon, and the overwrite 02–01 (dB) was determined from the output 02 (dB) of the 312.5 kHz component. Usually, −30 dB or below is practically required.

4. Surface electric resistance (Ω/sq) of magnetic layer

The surface electric resistance of the magnetic layer was measured according to the method of JIS-X6101.9.4 by using a digital super-insulation resistance tester ("TR-8611A" manufactured by Takeda Riken Co., Ltd.).

5. Running durability

A floppy disk drive (FD 1331 type manufactured by NEC Corporation) was used. Recording at a recording frequency of 625 kHz was performed on the total 240 tracks. At a position of 37.25 mm-radius, a thermocycle test, wherein the thermocycle flow shown in Table 1 is referred to as one cycle, was carried out. Running durability was evaluated by running state after 12,000,000 running passes under the above thermocycle conditions.

TABLE 1

Thermocycle flow

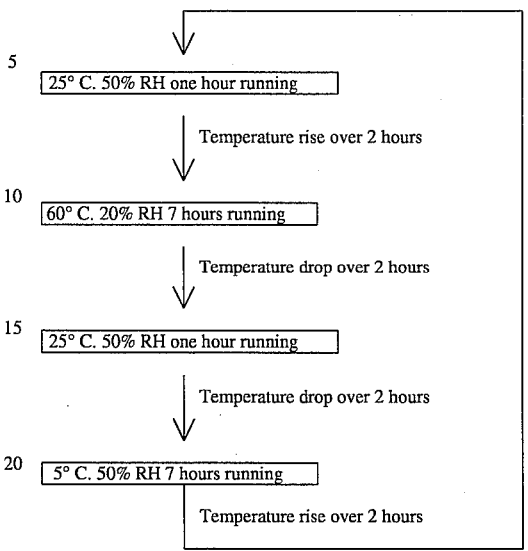

6. Thickness (t) of flexible magnetic disk

Ten sheets of the disks were placed in layers, and the thickness of the laminate was measured. The total thickness was divided by 10, to thereby determine the thickness per sheet.

7. Young's modulus (E) of non-magnetic layer and magnetic layer

Young's modulus (E) was measured in an atmosphere of 23° C. and 70% RH at a stress rate of 10%/min by using a tensile testing machine (universal tensile testing machine "STM-T-50BP" manufactured by Toyo Baldwin Co., Ltd.).

The results obtained by the above evaluation methods are shown in Tables 2 and 3. Young's modulus (E) shown in Tables 2 and 3 is shown wherein the Young's modulus in the lengthwise direction is larger than that in the crosswise direction.

TABLE 2

| Sample | E (Kg/mm$^2$) | t (μm) | Et$^3$ (g·mm) | Reproducing output (dB) mean value | max. | min. | Surface electric resistance (Ω/sq) | Running durability (× 10$^4$ times) | Ratio of orientation degree (—) | Overwrite characteristics (dB) |
|---|---|---|---|---|---|---|---|---|---|---|
| Example 1 | 485 | 67 | 146 | 100 | 101 | 99 | 2 × 10$^7$ | 1200 OK | 0.99 | −33 |
| Example 2 | 486 | 67 | 146 | 100 | 101 | 99 | 1 × 10$^7$ | 1200 OK | 0.99 | −34 |
| Example 3 | 645 | 67 | 194 | 101 | 102 | 100 | 3 × 10$^7$ | 1200 OK | 0.99 | −32 |
| Example 4 | 485 | 55 | 81 | 99 | 101 | 98 | 1 × 10$^7$ | 1200 OK | 0.98 | −35 |
| Example 5 | 692 | 67 | 208 | 97 | 100 | 95 | 5 × 10$^7$ | 1200 OK | 0.97 | −30 |
| Example 6 | 398 | 67 | 120 | 101 | 102 | 99 | 2 × 10$^7$ | 1200 OK | 0.99 | −33 |
| Example 7 | 396 | 77 | 181 | 98 | 101 | 96 | 4 × 10$^7$ | 1200 OK | 0.97 | −30 |
| Example 8 | 1351 | 40 | 86 | 101 | 102 | 99 | 2 × 10$^7$ | 1200 OK | 0.98 | −33 |
| Example 9 | 422 | 77 | 193 | 97 | 99 | 95 | 6 × 10$^7$ | 1200 OK | 0.96 | −30 |
| Example 10 | 423 | 67 | 127 | 99 | 101 | 98 | 3 × 10$^7$ | 1200 OK | 0.98 | −32 |
| Example 11 | 646 | 67 | 194 | 99 | 101 | 97 | 5 × 10$^7$ | 1200 OK | 0.99 | −34 |
| Example 12 | 483 | 55 | 80 | 101 | 103 | 99 | 2 × 10$^7$ | 1200 OK | 0.99 | −35 |
| Example 13 | 694 | 67 | 209 | 96 | 99 | 94 | 8 × 10$^7$ | 1200 OK | 0.98 | −30 |
| Example 14 | 396 | 67 | 119 | 102 | 104 | 99 | 4 × 10$^7$ | 1200 OK | 0.97 | −34 |
| Example 15 | 399 | 77 | 182 | 98 | 101 | 95 | 7 × 10$^7$ | 1200 OK | 0.98 | −31 |
| Example 16 | 1350 | 40 | 86 | 100 | 102 | 98 | 5 × 10$^7$ | 1200 OK | 0.99 | −33 |
| Example 17 | 420 | 77 | 192 | 102 | 104 | 98 | 6 × 10$^7$ | 1200 OK | 0.99 | −34 |
| Example 18 | 424 | 67 | 128 | 101 | 102 | 97 | 5 × 10$^7$ | 1200 OK | 0.98 | −34 |

TABLE 3

| Sample | E (Kg/mm²) | t (μm) | Et³ (g·mm) | Reproducing output (dB) mean value | max. | min. | Surface electric resistance (Ω/sq) | Running durability (× 10⁴ times) | Ratio of orientation degree (–) | Overwrite characteristics (dB) |
|---|---|---|---|---|---|---|---|---|---|---|
| Comp. Ex. 1 | 485 | 77 | 221 | 85 | 95 | 72 | $8 \times 10^7$ | 1100 DO* | 0.97 | −29 |
| Comp. Ex. 2 | 484 | 45 | 44 | 80 | 99 | 30 | $3 \times 10^7$ | 50 DO | 0.98 | −18 |
| Comp. Ex. 3 | 695 | 40 | 44 | 87 | 95 | 56 | $5 \times 10^7$ | 80 DO | 0.96 | −22 |
| Comp. Ex. 4 | 693 | 78 | 328 | 72 | 83 | 67 | $9 \times 10^7$ | 980 DO | 0.95 | −15 |
| Comp. Ex. 5 | 391 | 50 | 49 | 81 | 88 | 42 | $4 \times 10^7$ | 250 DO | 0.97 | −21 |
| Comp. Ex. 6 | 1351 | 67 | 406 | 55 | 64 | 38 | $8 \times 10^7$ | 360 DO | 0.95 | −19 |
| Comp. Ex. 7 | 487 | 77 | 222 | 81 | 93 | 63 | $7 \times 10^7$ | 880 DO | 0.99 | −22 |
| Comp. Ex. 8 | 486 | 45 | 44 | 72 | 93 | 25 | $2 \times 10^7$ | 40 DO | 0.98 | −12 |
| Comp. Ex. 9 | 692 | 40 | 44 | 80 | 86 | 32 | $4 \times 10^7$ | 60 DO | 0.99 | −18 |
| Comp. Ex. 10 | 690 | 78 | 327 | 65 | 75 | 58 | $5 \times 10^8$ | 540 DO | 0.98 | −21 |
| Comp. Ex. 11 | 391 | 50 | 49 | 85 | 90 | 55 | $4 \times 10^7$ | 430 DO | 0.97 | −25 |
| Comp. Ex. 12 | 1350 | 67 | 406 | 45 | 51 | 26 | $3 \times 10^8$ | 280 DO | 0.96 | −17 |
| Example 19 | 487 | 68 | 153 | 108 | 114 | 105 | $2 \times 10^8$ | 1200 OK | 0.97 | −19 |
| Example 20 | 488 | 68 | 153 | 110 | 113 | 106 | $4 \times 10^8$ | 1200 OK | 0.99 | −21 |
| Example 21 | 484 | 67 | 146 | 101 | 103 | 98 | $5 \times 10^{12}$ | 560 DO | 0.99 | −33 |
| Example 22 | 485 | 67 | 146 | 100 | 102 | 97 | $1 \times 10^{12}$ | 720 DO | 0.99 | −34 |
| Example 23 | 484 | 67 | 146 | 85 | 92 | 48 | $2 \times 10^7$ | 1200 OK | 0.99 | −33 |

*: Drop-out occurred

Loop system flexural rigidity was measured in the following manner. It was found that the samples of the present invention have a value in the range of 5.0 to 8.0 g.

Loop system flexural rigidity

A loop was made from a disc sample of 50 mm long by 8 mm wide, and a force required for giving displacement of 5 mm at a displacement rate of 3.5 mm/sec was represented by grams.

As is apparent from the results in Tables 2 and 3 that the flexible magnetic disks having Et³ in the required range of 50 to 210 g·mm according to the present invention have such excellent performances that a difference in reproducing output between the maximum value and the minimum value is small, reproducing output having a high mean output can be obtained, the ratio of orientation degree is high, overwrite characteristics are good, and running durability can be satisfactorily ensured.

On the other hand, the Et³ of the comparative magnetic disks is either too large or too small. Hence, head touch is insufficient and electromagnetic characteristics such as overwrite characteristics are poor. Particularly, since Et³ in Comparative Examples 2, 3, 5, 8, 9 and 11 is small, fluctuation in output due to unevenness in rotation occurs and running durability is poor. In addition, in the discs of these Comparative Examples, drop-out occurs.

As mentioned above, the present invention provides a flexible magnetic disk comprising a magnetic layer having a thickness of not more than 0.5 μm. This magnetic layer is used as a magnetic recording medium for a floppy disk, suitable for use in high-density recording, i.e., a narrow track short wave recording. The flexible magnetic disc of the present invention comprises a support having thereon a non-magnetic layer comprising a non-magnetic powder dispersed in a binder, and a magnetic layer comprising ferromagnetic powder dispersed in a binder. The non-magnetic layer is a layer mainly comprising non-magnetic powder and a binder resin. All or a part of the non-magnetic powder is electrically conductive powder. The product Et³ of Young's modulus (E) of the disk and the cube of the thickness (t) thereof, is in the range of 50 g·mm (lower limit) to 210 g·mm (upper limit). Therefore, a highly durable magnetic disk which enables good head touch to be made and is excellent in electromagnetic characteristics can be provided.

While the invention has been described in detail and with reference to specific embodiments thereof, it will be apparent to one skilled in the art that various changes and modifications can be made therein without departing from the spirit and scope thereof.

What is claimed is:

1. A two-sided flexible magnetic disk comprising a non-magnetic support having thereon a non-magnetic layer comprising mainly a non-magnetic powder and a binder resin, and a magnetic layer having a thickness of not more than 0.5 μm comprising mainly a ferromagnetic metallic powder or a hexagonal ferrite powder and a binder resin, in this order, wherein said non-magnetic layer comprises an electrically conductive powder which is present in an amount of 3 to 20% by weight based on the total amount of non-magnetic powder in the non-magnetic layer, and the product Et³ of Young's modulus (E) of said flexible magnetic disk and the cube of the thickness (t) thereof is 50 to 210 g·mm.

2. The flexible magnetic disk as claimed in claim 1, wherein said flexible magnetic disk is used in a recording system containing a recording track having an innermost periphery having a diameter of 20 mm or more.

3. The flexible magnetic disk as claimed in claim 1, wherein said flexible magnetic disk has a surface electric resistance of 5×10⁹ Ω/sq or less.

4. The flexible magnetic disk as claimed in claim 1, wherein said product Et³ is 70 to 200 g·mm.

5. The flexible magnetic disk as claimed in claim 1, wherein said non-magnetic layer contains carbon black as the electrically conductive powder in an amount of 3 to 20% by weight based on the total amount of the non-magnetic powder.

6. The flexible magnetic disk as claimed in claim 1, wherein said magnetic layer contains carbon black in an amount of 0.1 to 30% by weight based on the amount of the ferromagnetic powder.

7. The flexible magnetic disk as claimed in claim 1, wherein the value of t is in the range of 10 to 80 μm and the value of E is in the range of 300 to 2,000 kg/mm².

* * * * *